Patented July 29, 1924.

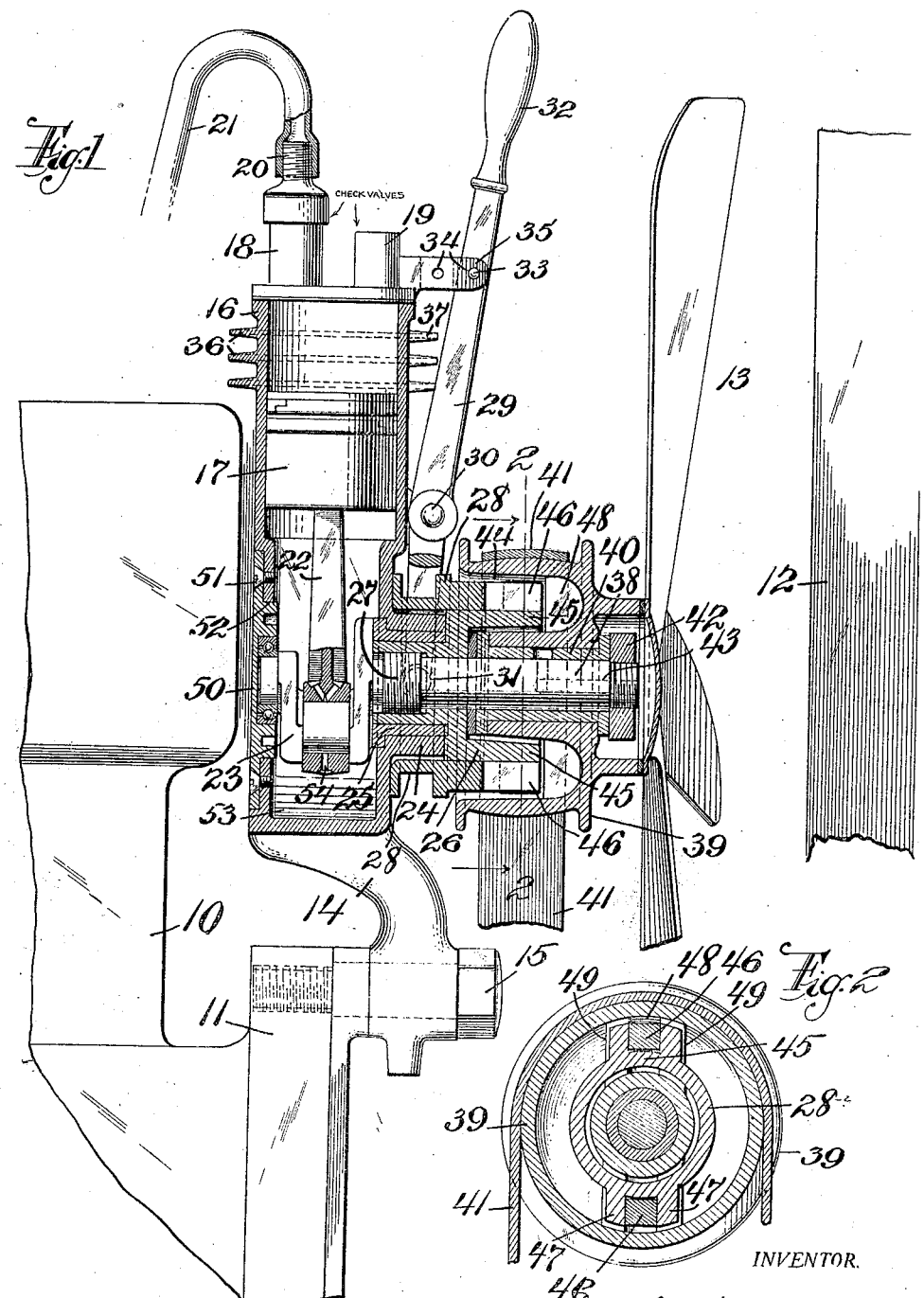

1,503,002

UNITED STATES PATENT OFFICE.

STEPHEN NAGY, OF IRVINGTON, NEW JERSEY, ASSIGNOR OF ONE-HALF TO NIKOLAS VIEHMANN, OF NEWARK, NEW JERSEY.

PUMP FOR INTERNAL-COMBUSTION ENGINES.

Application filed April 11, 1923. Serial No. 631,470.

*To all whom it may concern:*

Be it known that I, STEPHEN NAGY, a citizen of Hungary, and a resident of Irvington, county of Essex, and State of New Jersey, have invented certain new and useful Improvements in Pumps for Internal-Combustion Engines, of which the following is a specification.

This invention relates to an improved pump and provides a pump that can be used for inflating tires and similar purposes and is mounted on internal combustion engines directly in front of the engine and in rear of the fan employed on such engines for cooling purposes.

The invention is designed to provide a pump, the casing of which is secured in position on the engine, the pump casing in turn acting as a support for the fan and its pulley, and also supporting a clutch which is used for connecting and disconnecting the mechanism of the pump and the pulley of the fan.

In this device the fan is used continuously, as usual, when the engine is running, and when the clutch is thrown out the pump is not in use, but when the pump is to be operated, all that is necessary to do is to throw the clutch and the pump is connected with the pulley of the fan and is driven therefrom.

This invention provides a pump of this kind which is insertable in engines as now constructed, and is so compact that the pulley of the fan is retained in its normal position, therefore requiring no readjustment of the driving pulley.

The invention is illustrated in the accompanying drawings, in which Figure 1 is an elevation of part of an engine, showing the pump and its associated parts in section, and Figure 2 is a cross-section taken on the line 2—2 in Figure 1.

I illustrate the device as being particularly adapted for use on a Ford engine, the engine being shown at 10, and the usual supporting bracket 11 being illustrated at the front of the engine casing, and between the engine and the radiator 12 is mounted the fan 13, this fan being always placed directly in rear of the radiator. The pump casing is made so as to fit between the fan and the engine casing, the pump casing being shown at 13, and while in different makes of engines it is adapted to be fastened in any desired way, I show a lug 14 which is fastened by means of the bolt 15 to the bracket 11. The pump casing at its upper portion is provided with a cylinder 16 in which is the piston 17 which, when reciprocated, compresses air in the top of the cylinder, the air being forced out through the outlet check valve 18 on the upward stroke of the piston, and drawing air into the cylinder through the inlet valve 19, the valve 19 also being a check valve.

A suitable hose connection 20 is used to secure the flexible pipe or hose 21, which at its other end, of course, has a suitable fixture for its attachment to a tire valve or other similar element. The piston is operated by a piston rod 22 which is connected to the crank shaft 23.

The pump casing is provided with a bearing 24 which can be provided with a suitable lining 25 for the fixed clutch member 26. The definition "fixed" relative to the clutch member means a clutch member that normally does not rotate when the clutch is disconnected, and which is not movable longitudinally. This fixed clutch member 26 is connected with the crank shaft 23, and I show the connection 27, which is a screw-threaded connection, as one means of connecting these parts. The clutch member 26 supports the sliding clutch member 28 which can be slid back and forth by suitable means, such as the shifting lever 29, pivoted at 30 to the pump casing and having the forked end 31 of the usual type to slide the clutch member.

The clutch lever 29 may be provided with a handle 32, the handle being held in its operative and inoperative positions by a pin 33 which can be slid through openings 34 in the plate 35, the cooling ribs 36 being cut away, as at 37, to permit the inward movement of the clutch lever 29.

Supported by the fixed clutch member 26, and in extension of the part 27 of the crank shaft, is the jack shaft 38 which, in turn, supports the fan pulley 39 which rotates the anti-friction lining 40 and is driven by the belt 41 from the usual driving pulley driven from the engine, which driving pulley is not shown. The fan 13 is suitably secured to the pulley 39. The fan pulley and the parts between it and the pump casing are held in position by suitable means, such as the nut 42. The lubricating duct 43 insures lubrication of the pulley.

The pulley is provided with a chamber 44, into which the flange 45 of the clutch member 26 projects and which also receives the fingers 46 of the sliding clutch member 28. The fingers 46 slide between the lugs 47 on the clutch member 26, and are also adapted to slide in the space 48 arranged at the inner end of the chamber 44 between the abutments 49.

It will thus be evident that the fingers 46, when thrust forward, will serve as a connection and insure the rotation of the fixed clutch member with the fan pulley, and on the other hand, when slid back from the openings 48 will leave the fan pulley free to rotate without affecting any parts of the pump mechanism.

The bearing 50 for the other end of the crank shaft 23 is preferably made to form part of the pump casing and is easily removed, in the form shown this being done by taking out the fastening screws 51. It will be noted from the drawing that the bearing 50 is of a diameter large enough to permit the longitudinal withdrawal of the crank shaft through the opening 52 in the pump casing, this being desirable in case of repair and also to permit lubricant being placed in the bottom of the pump casing, this bottom part at 53 forming a crank case which is adapted to be used as an ordinary crank case for the retention of lubricant which lubricates the piston rod and the crank shaft through the ducts 54.

It will be evident that modifications can be made in the proportion of the parts, and different securing devices and attaching means can be used for securing the pump casing to the engine or similar support, without departing from the scope of the invention.

All that it is necessary to do when the device is to be used is to throw the clutch lever 29 so as to move the sliding clutch member 28 forward, and the pump is then operated directly from the fan pulley.

It will also be noted that this compact structure is possible by reason of the pump casing acting as a support not only for its contained pumping elements, but also for the clutch members, the fan pulley and the fan, these associated parts being thus easily arranged in the space now available in an automobile, as no other supporting brackets or fixtures are necessary.

I claim:

1. A pump having its casing provided with a bearing for supporting a fan shaft, a fan pulley, a clutch for engaging the pulley with the shaft, all of said associated parts being supported by the pump casing.

2. A pump comprising a pump casing secured in fixed position, a fan pulley, a crank shaft in the pump, and a clutch for connecting and disconnecting the pulley and the crank shaft, the pulley, the clutch and the shaft all being supported solely by the pump casing.

3. A pump comprising a pump casing having a lug for attaching it to an engine, a piston in the casing, a crank shaft in the casing, a bearing supporting one end of the crank shaft, a fixed clutch member in the bearing, a jack shaft supported by the clutch member, a fan pulley supported on the jack shaft and freely rotatable thereon, and a sliding clutch member on the fixed member and having coacting means with the fixed member and the pulley to connect and disconnect them.

4. A pump comprising a pump casing having a lug for attaching it to an engine, a piston in the casing, a crank shaft in the casing, a bearing supporting one end of the crank shaft, a fixed clutch member in the bearing, a jack shaft supported by the clutch member, a fan pulley supported on the jack shaft and freely rotatable thereon, and a sliding clutch member on the fixed member and having coacting means with the fixed member and the pulley to connect and disconnect them, a bearing for the other end of the crank shaft said last mentioned bearing being removable and of a diameter to permit the longitudinal withdrawal of the crank shaft.

In testimony that I claim the foregoing, I have hereto set my hand, this 7th day of April, 1923.

STEPHEN NAGY.